(12) United States Patent
Wu

(10) Patent No.: US 6,776,483 B1
(45) Date of Patent: Aug. 17, 2004

(54) SPECTACLES HAVING ANGLE ADJUSTABLE FUNCTION

(76) Inventor: Jin-Feng Wu, 58, Ma Yuan West St., Taichung (TW)

( * ) Notice: Subject to any disclaimer, the term of this patent is extended or adjusted under 35 U.S.C. 154(b) by 0 days.

(21) Appl. No.: 10/743,680

(22) Filed: Dec. 19, 2003

Related U.S. Application Data

(63) Continuation-in-part of application No. 10/356,767, filed on Jan. 29, 2003.

(51) Int. Cl.$^7$ .................................................. G02C 5/14
(52) U.S. Cl. ....................................... 351/120; 351/119
(58) Field of Search ............................... 351/120, 118, 351/119, 111, 116, 41

(56) References Cited

U.S. PATENT DOCUMENTS 5,812,234 A * 9/1998 Carswell ..................... 351/120
6,454,406 B1 * 9/2002 Guo ........................... 351/120

* cited by examiner

Primary Examiner—Hung Xuan Dang

(57) ABSTRACT

A pair of spectacles includes a rim, two angle adjusting devices each mounted on the rim, and two temples each mounted on a respective angle adjusting device. Each of the angle adjusting devices includes a connecting member formed with a locking pawl, and a pivot member pivotally mounted on the connecting member and formed with locking grooves. Thus, the locking pawl of the connecting member is detachably locked in either one of the locking grooves of the pivot member, so that the included angle between the connecting member and the pivot member is changed arbitrarily so as to adjust the angle of the rim relative to the temples.

12 Claims, 6 Drawing Sheets

SPECTACLES HAVING ANGLE ADJUSTABLE FUNCTION

CROSS-REFERENCES TO RELATED APPLICATIONS

The present invention is a continuation-in-part application of the co-pending U.S. Ser. No. 10/356,767, filed on Jan. 29, 2003.

BACKGROUND OF THE INVENTION

1. Field of the Invention

The present invention relates to a pair of spectacles, and more particularly to a pair of spectacles having an angle adjustable function.

2. Description of the Related Art

A conventional temple mounting arrangement in accordance with the prior art is disclosed in U.S. Pat. No. 6,454,406-B1 to Guo, and comprises a rim 10, a temple 20, and a coupling block 30. The temple 20 comprises a butt-strap 22 comprising a short pivot rod 23 and a plurality of teeth 25. The coupling block 30 comprises a receiving chamber 31 for receiving the butt-strap 22 of the temple 20, a plurality of retaining grooves 35 disposed in the inner side of the receiving chamber 31 for engaging the teeth 25 of the butt-strap 22.

SUMMARY OF THE INVENTION

The primary objective of the present invention is to provide a pair of spectacles having an angle adjustable function.

Another objective of the present invention is to provide a pair of spectacles, wherein the locking pawl of the connecting member is detachably locked in either one of the locking grooves of the pivot member, so that the angle between the connecting member and the pivot member is changed arbitrarily so as to adjust the angle of the rim relative to the temples.

A further objective of the present invention is to provide a pair of spectacles, wherein the locking pawl of the connecting member is closely locked in either one of the locking grooves of the pivot member, so that the connecting member is combined with the pivot member rigidly and stably.

A further objective of the present invention is to provide a pair of spectacles, wherein each of the two opposite limit plates of the connecting member is movable to abut an edge of the pivot member, thereby preventing the locking pawl of the connecting member from releasing from the locking grooves of the pivot member.

In accordance with the present invention, there is provided a pair of spectacles, comprising a rim having two ends, two angle adjusting devices each mounted on a respective one of the two ends of the rim, and two temples each mounted on a respective one of the two angle adjusting devices, wherein:

each of the two angle adjusting devices includes a connecting member, and a pivot member;

the connecting member of each of the two angle adjusting devices has a bifurcated first end formed with a longitudinally extended insertion slot and a transversely extended circular pivot hole communicating with the insertion slot, the first end of the connecting member is formed with a wedge-shaped flexible locking pawl and two opposite limit plates;

the pivot member of each of the two angle adjusting devices is pivotally mounted in the insertion slot of the connecting member and has a first end formed with a plurality of locking grooves, so that the locking pawl of the connecting member is detachably locked in either one of the locking grooves of the pivot member, the pivot member of each of the two angle adjusting devices has two sides each formed with a circular pivot axle extended through the insertion slot and pivotally mounted in the pivot hole of the connecting member.

Further benefits and advantages of the present invention will become apparent after a careful reading of the detailed description with appropriate reference to the accompanying drawings.

DETAILED DESCRIPTION OF THE INVENTION

Figure 1:
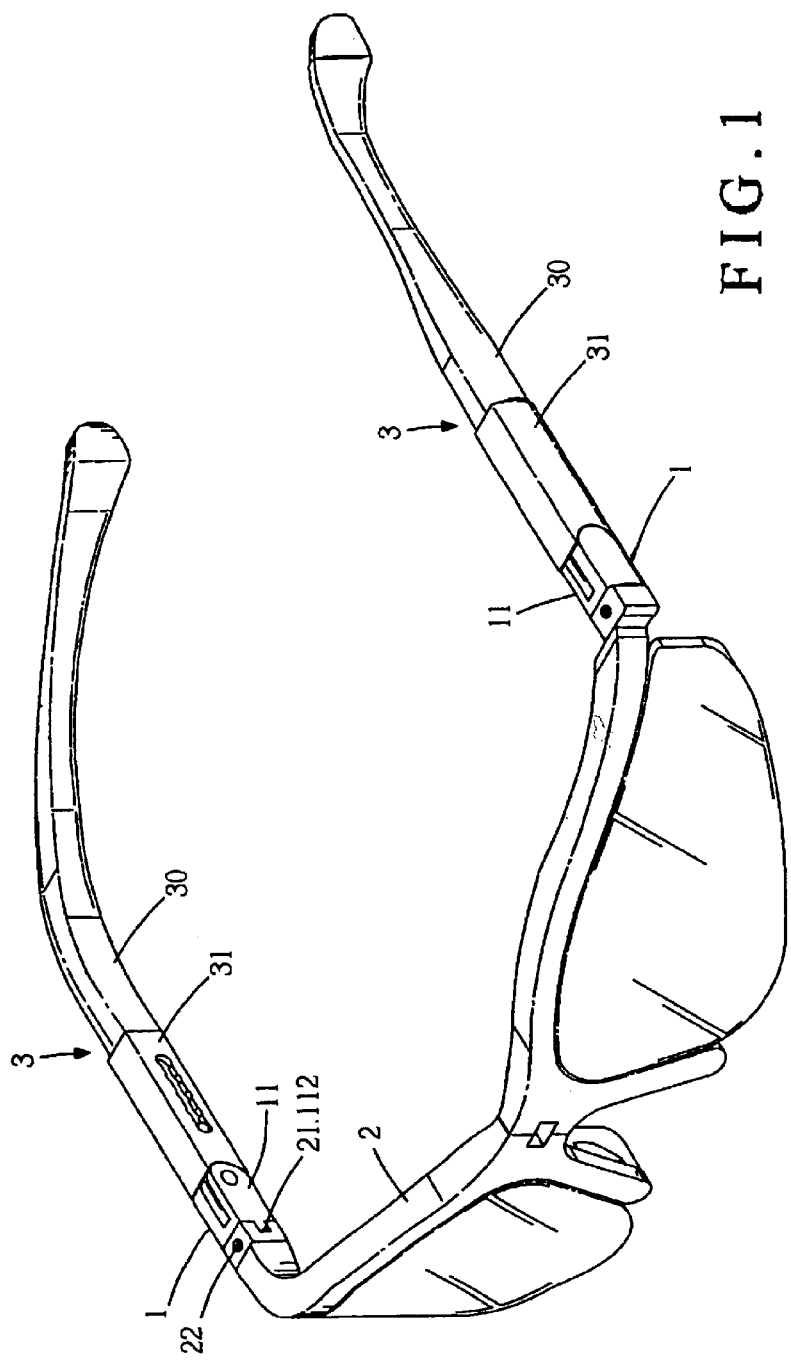
FIG. 1 is a perspective view of a pair of spectacles in accordance with the preferred embodiment of the present invention.
Figure 2:
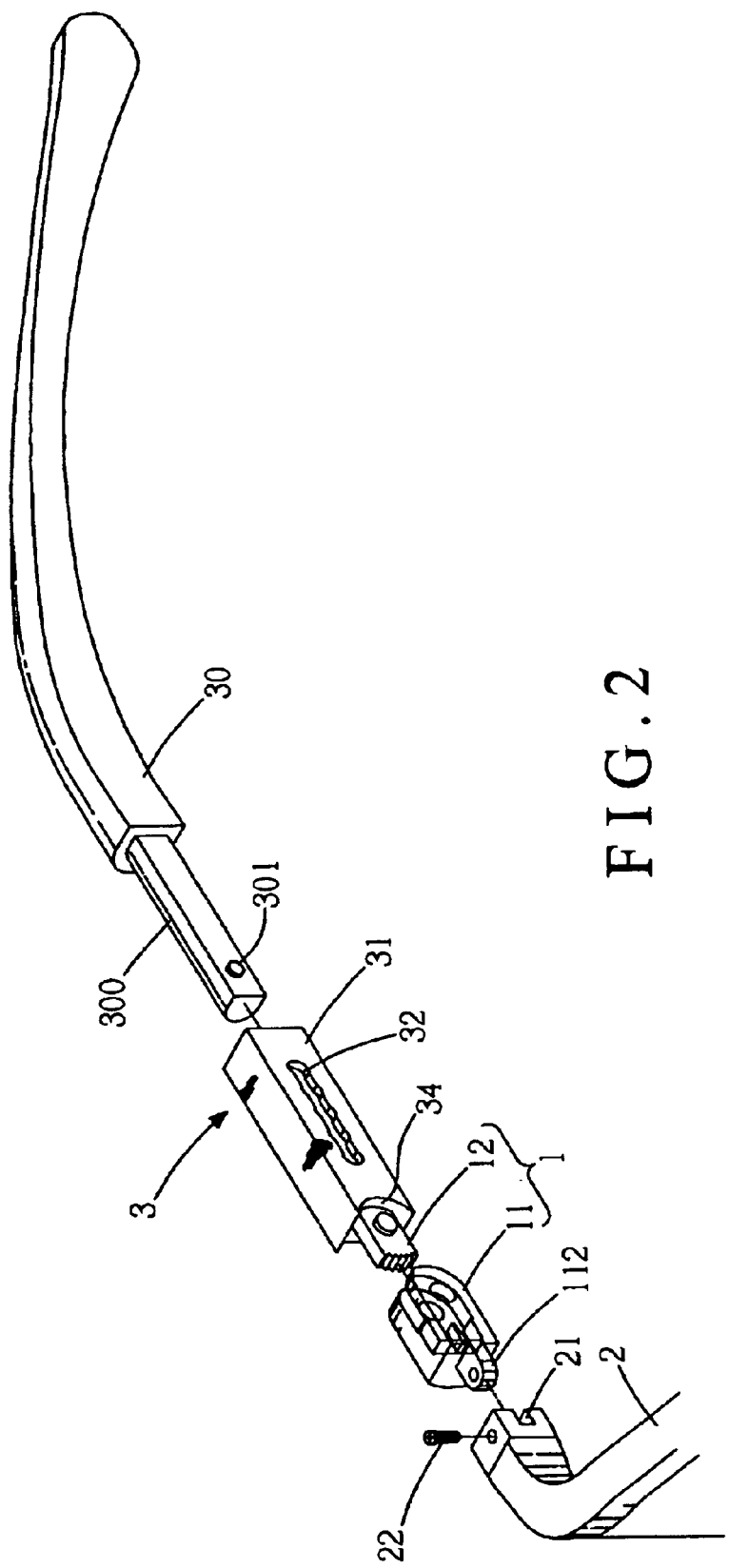
FIG. 2 is a partially cut-away exploded perspective view of the spectacles as shown in FIG. 1.
Figure 3:
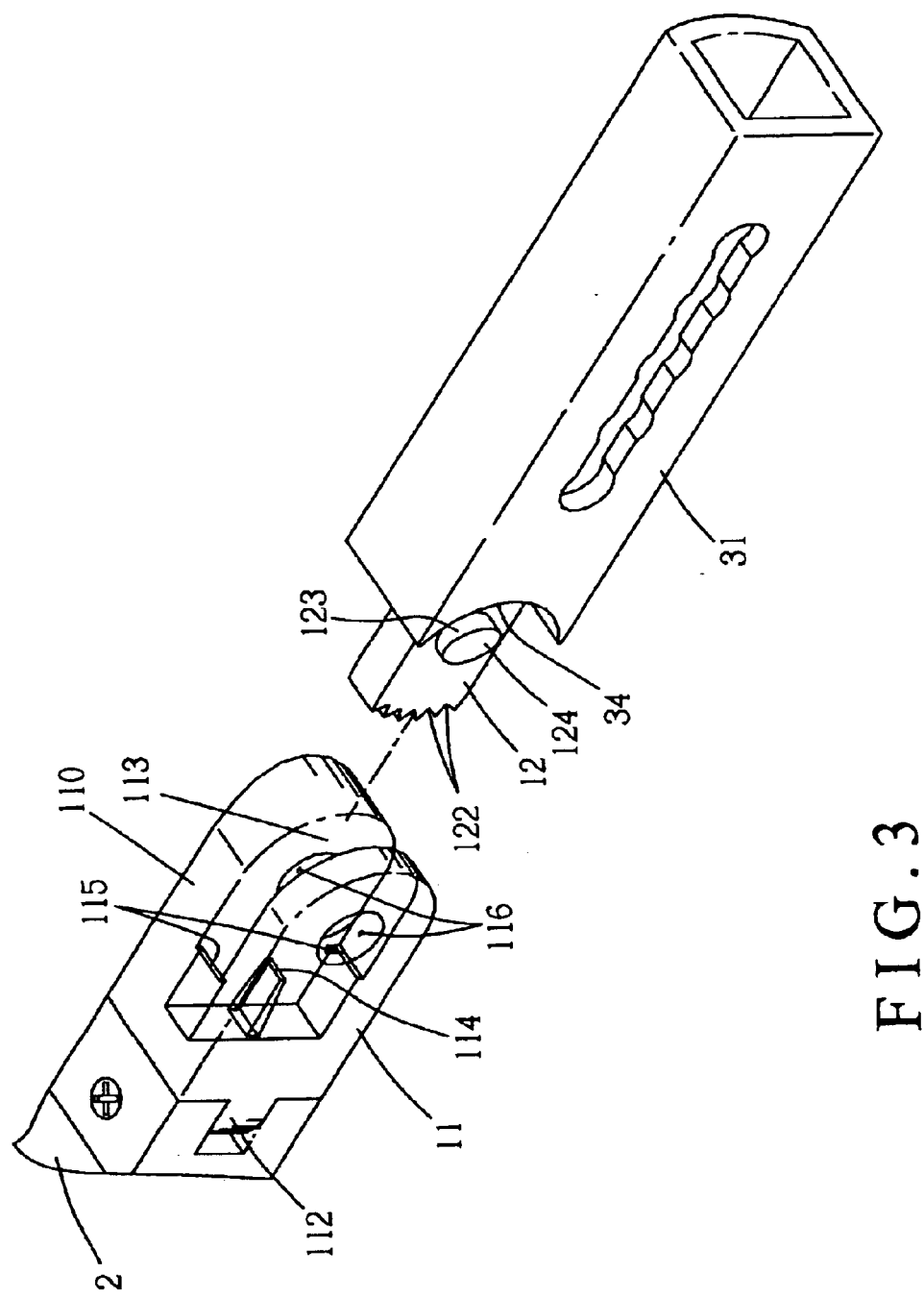
FIG. 3 is a partially cut-away exploded perspective view of the spectacles as shown in FIG. 1.
Figure 4:
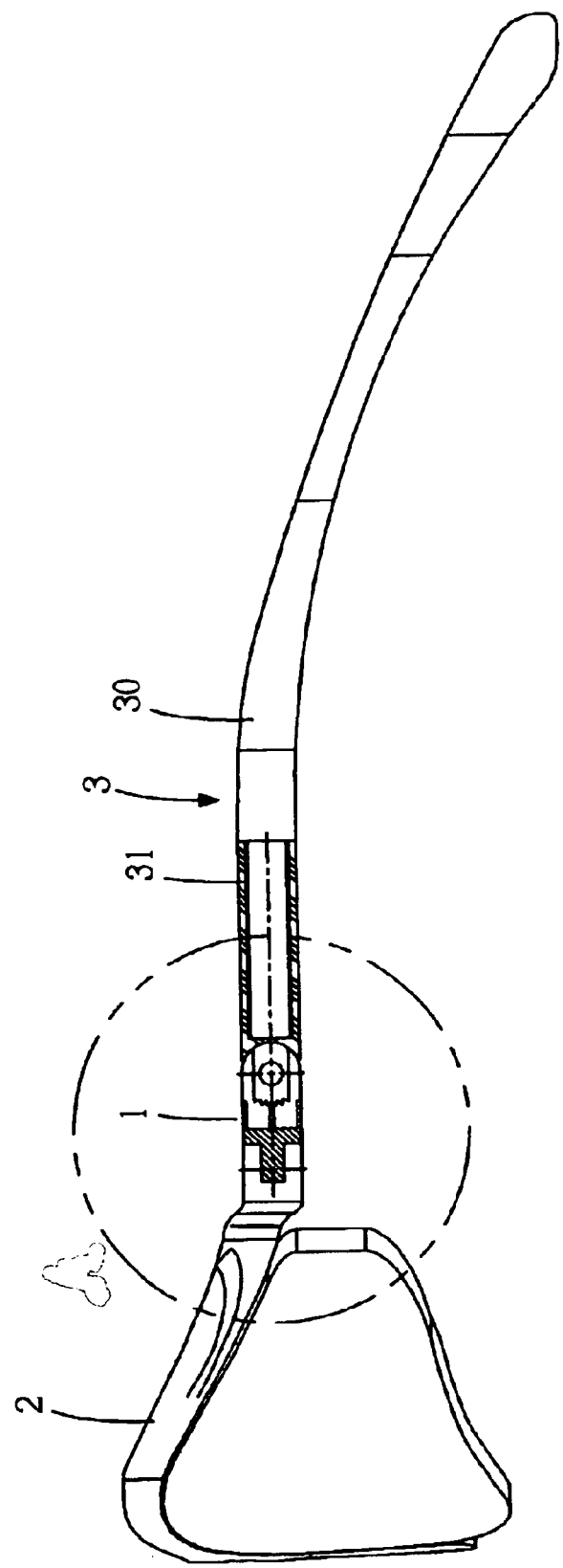
FIG. 4 is a partially plan cross-sectional view of the spectacles as shown in FIG. 1.

Referring to the drawings and initially to FIGS. 1–4, a pair of spectacles in accordance with the preferred embodiment of the present invention comprise a rim 2 having two ends, two angle adjusting devices 1 each mounted on a respective one of the two ends of the rim 2, and two temples 3 each mounted on a respective one of the two angle adjusting devices 1.

Each of the two angle adjusting devices 1 includes a connecting member 11, and a pivot member 12.

The connecting member 11 of each of the two angle adjusting devices 1 has a bifurcated first end 110 formed with a longitudinally extended insertion slot 113 and a transversely extended circular pivot hole 116 communicating with the insertion slot 113. The first end of the connecting member 11 has a semi-circular side. The first end of the connecting member 11 is formed with a wedge-shaped flexible locking pawl 114 and two opposite limit plates 115, with the locking pawl 114 being located between the two opposite limit plates 115. Preferably, the locking pawl 114 of the connecting member 11 is extended into the insertion slot 113 and is separated from a peripheral wall of the insertion slot 113, and the two opposite limit plates 115 of the connecting member 11 is extended into the insertion slot 113 and is connected to the peripheral wall of the insertion slot 113.

The connecting member 11 of each of the two angle adjusting devices 1 has a second end pivotally mounted on a respective one of the two ends of the rim 2. Preferably, each of the two ends of the rim 2 is formed with a forked pivot seat 21, and the second end of the connecting member 11 is formed with a pivot ear 112 pivotally mounted on the respective pivot seat 21 of the rim 2 by a screw member 22.

The pivot member 12 of each of the two angle adjusting devices 1 is pivotally mounted in the insertion slot 113 of the connecting member 11 and has a first end formed with a plurality of substantially V-shaped locking grooves 122 which are protruded outward and are arranged in an arc-shaped manner. The locking pawl 114 of the connecting member 11 is detachably locked in either one of the locking grooves 122 of the pivot member 12.

The pivot member 12 of each of the two angle adjusting devices 1 has two sides each formed with a circular pivot axle 123 extended through the insertion slot 113 and pivotally mounted in the pivot hole 116 of the connecting member 11. The pivot axle 123 of the pivot member 12 has a beveled face 124 to facilitate the pivot axle 123 of the pivot member 12 entering the pivot hole 116 of the connecting member 11.

Each of the two temples 3 includes a hollow length adjusting member 31 mounted on or integrally formed with a second end of the pivot member 12 of a respective one of the two angle adjusting devices 1, and a bend 30 having a distal end 300 movably mounted in the length adjusting member 31. The length adjusting member 31 has a side wall formed with a corrugated adjusting slot 32, and the distal end 300 of the bend 30 has a side formed with an adjusting knob 301 slidably mounted in the adjusting slot 32 of the length adjusting member 31. The length adjusting member 31 has an end formed with an arc-shaped recess 34 pivotally mounted on the semi-circular side of the first end of the connecting member 11.

Figure 5:
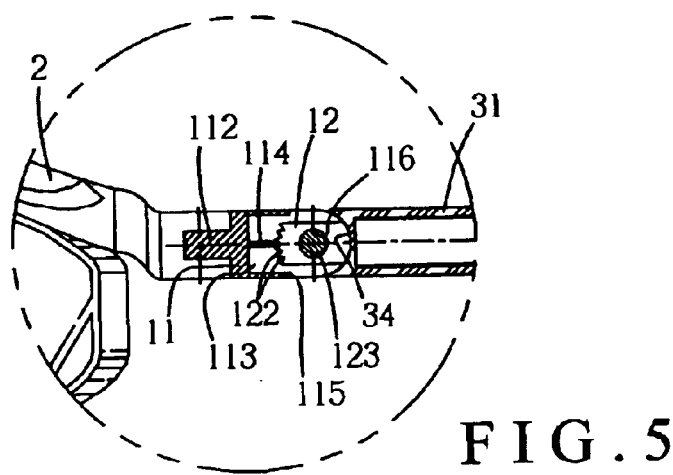
FIG. 5 is a partially enlarged view of the spectacles as shown in FIG. 4.
Figure 5A:
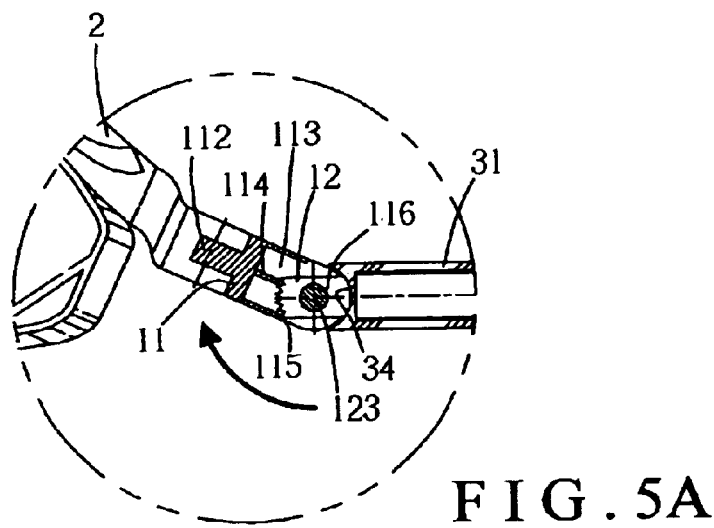
FIG. 5A is a schematic operational view of the spectacles as shown in FIG. 5.
Figure 5B:
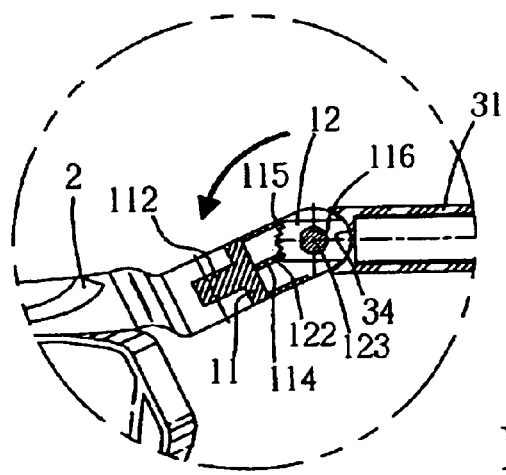
FIG. 5B is a schematic operational view of the spectacles as shown in FIG. 5.

In operation, referring to FIGS. 1–5, when the rim 2 is pressed to move relative to the length adjusting member 31 of the two temples 3 as shown in FIGS. 5A and 5B, the connecting member 11 is moved with the rim 2 to pivot relative to the pivot member 12, so that the locking pawl 114 is moved with the connecting member 11 to detach from the respective locking groove 122 of the pivot member 12 by flexibility of the locking pawl 114. In such a manner, the connecting member 11 is pivoted relative to the pivot member 12 until the locking pawl 114 is locked in another locking groove 122 of the pivot member 12 as shown in FIGS. 5A and 5B.

Accordingly, the locking pawl 114 of the connecting member 11 is detachably locked in either one of the locking grooves 122 of the pivot member 12, so that the angle between the connecting member 11 and the pivot member 12 is changed arbitrarily so as to adjust the angle of the rim 2 relative to the temples 3. In addition, the locking pawl 114 of the connecting member 11 is closely locked in either one of the locking grooves 122 of the pivot member 12, so that the connecting member 11 is combined with the pivot member 12 rigidly and stably. Further, each of the two opposite limit plates 115 of the connecting member 11 is movable to abut an edge of the pivot member 12 as shown in FIGS. 5A and 5B, thereby preventing the locking pawl 114 of the connecting member 11 from releasing from the locking grooves 122 of the pivot member 12.

Figure 7:
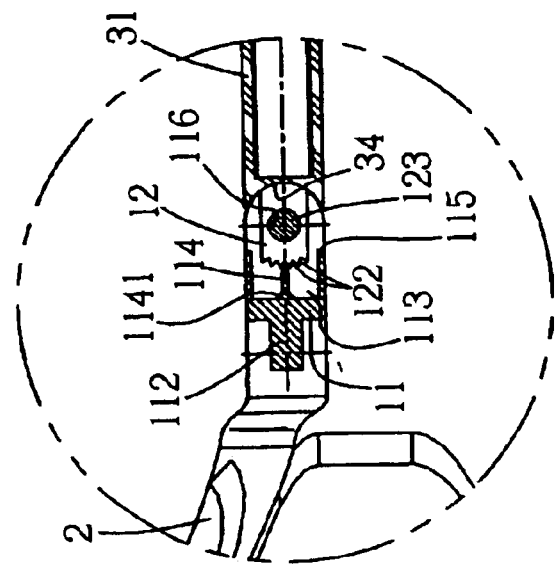
FIG. 7 is a partially plan cross-sectional view of the spectacles as shown in FIG. 6.
Figure 6:
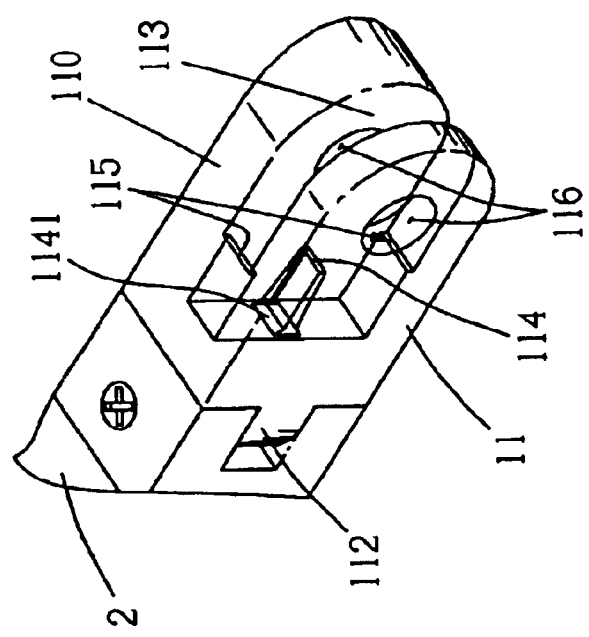
FIG. 6 is a partially cut-away perspective view of a pair of spectacles in accordance with another embodiment of the present invention.

Referring to FIGS. 6 and 7, the locking pawl 114 of the connecting member 11 has a root portion having two sides each formed with a reinforced rib 1141 to enhance the strength of the locking pawl 114 of the connecting member 11.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A pair of spectacles, comprising a rim having two ends, two angle adjusting devices each mounted on a respective one of the two ends of the rim, and two temples each mounted on a respective one of the two angle adjusting devices, wherein:

each of the two angle adjusting devices includes a connecting member, and a pivot member;

the connecting member of each of the two angle adjusting devices has a bifurcated first end formed with a longitudinally extended insertion slot and a transversely extended circular pivot hole communicating with the insertion slot, the first end of the connecting member is formed with a wedge-shaped flexible locking pawl and two opposite limit plates;

the pivot member of each of the two angle adjusting devices is pivotally mounted in the insertion slot of the connecting member and has a first end formed with a plurality of locking grooves, so that the locking pawl of the connecting member is detachably locked in either one of the locking grooves of the pivot member;

the pivot member of each of the two angle adjusting devices has two sides each formed with a circular pivot axle extended through the insertion slot and pivotally mounted in the pivot hole of the connecting member.

2. The spectacles in accordance with claim 1, wherein the locking pawl is located between the two opposite limit plates.

3. The spectacles in accordance with claim 1, wherein the locking pawl of the connecting member is extended into the insertion slot and is separated from a peripheral wall of the insertion slot.

4. The spectacles in accordance with claim 1, wherein the two opposite limit plates of the connecting member is extended into the insertion slot and is connected to a peripheral wall of the insertion slot.

5. The spectacles in accordance with claim 1, wherein each of the locking grooves of the pivot member is substantially V-shaped.

6. The spectacles in accordance with claim 1, wherein the locking grooves of the pivot member are protruded outward and are arranged in an arc-shaped manner.

7. The spectacles in accordance with claim 1, wherein the pivot axle of the pivot member has a beveled face to facilitate the pivot axle of the pivot member entering the pivot hole of the connecting member.

8. The spectacles in accordance with claim 1, wherein each of the two opposite limit plates of the connecting member is movable to abut an edge of the pivot member, thereby preventing the locking pawl of the connecting member from releasing from the locking grooves of the pivot member.

9. The spectacles in accordance with claim 1, wherein the locking pawl of the connecting member has a root portion having two sides each formed with a reinforced rib to enhance a strength of the locking pawl of the connecting member.

10. The spectacles in accordance with claim 1, wherein each of the two temples includes a hollow length adjusting member mounted on a second end of the pivot member of a respective one of the two angle adjusting devices, and a bend having a distal end movably mounted in the length adjusting member.

11. The spectacles in accordance with claim 10, wherein the first end of the connecting member has a semi-circular side, and the length adjusting member has an end formed with an arc-shaped recess pivotally mounted on the semi-circular side of the first end of the connecting member.

12. The spectacles in accordance with claim 1, wherein the connecting member of each of the two angle adjusting devices has a second end pivotally mounted on a respective one of the two ends of the rim.

* * * * *